United States Patent
Wiklem et al.

(10) Patent No.: US 9,889,373 B1
(45) Date of Patent: Feb. 13, 2018

(54) MULTILAYER FRAMEWORK AND ARCHITECTURE WITH VARIABLE VIDEO GAMING CAPABILITIES

(71) Applicant: CP Studios LLC, Salt Lake City, UT (US)

(72) Inventors: Brian Joseph Wiklem, Salt Lake City, UT (US); Carrie Ann Cowan, Salt Lake City, UT (US)

(73) Assignee: CP Studios LLC, Salt Lake City, UT (US)

( * ) Notice: Subject to any disclaimer, the term of this patent is extended or adjusted under 35 U.S.C. 154(b) by 343 days.

(21) Appl. No.: 13/889,276

(22) Filed: May 7, 2013

Related U.S. Application Data

(60) Provisional application No. 61/643,352, filed on May 7, 2012.

(51) Int. Cl.
A63F 13/00 (2014.01)
A63F 13/30 (2014.01)

(52) U.S. Cl.
CPC .................................. *A63F 13/12* (2013.01)

(58) Field of Classification Search
CPC ......... A63F 13/12; A63F 13/23; A63F 13/822
See application file for complete search history.

(56) References Cited

U.S. PATENT DOCUMENTS

| | | | |
|---|---|---|---|
| 6,386,980 B1 | 5/2002 | Nishino et al. | |
| 6,478,679 B1 | 11/2002 | Himoto et al. | |
| 6,699,125 B2 * | 3/2004 | Kirmse | A63F 13/12 463/42 |
| 7,628,688 B2 * | 12/2009 | Hinami | 463/9 |
| 7,955,175 B1 * | 6/2011 | Holloway | G06Q 10/00 273/317.1 |
| 8,200,020 B1 * | 6/2012 | Geiss | G06K 9/00979 382/190 |
| 8,287,341 B1 | 10/2012 | Reynolds et al. | |
| 8,366,546 B1 * | 2/2013 | Naik | A63F 13/12 463/31 |
| 2003/0008710 A1 | 1/2003 | Yamaoka et al. | |
| 2003/0038805 A1 | 2/2003 | Wong et al. | |
| 2004/0266529 A1 | 12/2004 | Chatani | |
| 2005/0049022 A1 | 3/2005 | Mullen | |
| 2007/0087797 A1 | 4/2007 | Van Luchene | |
| 2008/0004117 A1 | 1/2008 | Stamper et al. | |
| 2009/0307226 A1 * | 12/2009 | Koster et al. | 707/10 |
| 2010/0197380 A1 * | 8/2010 | Shackleton | 463/22 |

(Continued)

OTHER PUBLICATIONS

Clash of Clans Stragegy Guide—Tapscape www.tapscape.com/clash-of-clans-strategy-guide/.*

(Continued)

*Primary Examiner* — Omkar Deodhar
*Assistant Examiner* — Eric M Thomas
(74) *Attorney, Agent, or Firm* — Patent Law Works LLP

(57) ABSTRACT

A multilayer framework and architecture with variable video or digital gaming capabilities provides multiple levels of play, permitting players to engage in different ways. The different levels of play options include 1) a peer-to-peer competitive challenge level for "core" players, 2) a "follower" play option for players with restricted capabilities and access to portions of a game; and a 3) "bystander" play option that permits non-players in a network to either observe or play from a reactive perspective.

14 Claims, 11 Drawing Sheets

(56) References Cited

U.S. PATENT DOCUMENTS

| | | |
|---|---|---|
| 2010/0216553 A1 | 8/2010 | Chudley et al. |
| 2010/0228614 A1 | 9/2010 | Zhang et al. |
| 2011/0034246 A1 | 2/2011 | Amitzur |
| 2011/0201414 A1* | 8/2011 | Barclay et al. ............... 463/25 |
| 2011/0320401 A1 | 12/2011 | Mahajan et al. |
| 2012/0220377 A1 | 8/2012 | Cantor |
| 2012/0254764 A1 | 10/2012 | Ayloo et al. |
| 2013/0006709 A1 | 1/2013 | Kosta |
| 2013/0035164 A1 | 2/2013 | Osvald et al. |
| 2013/0097517 A1 | 4/2013 | Reiss et al. |
| 2013/0103447 A1 | 4/2013 | Melander et al. |
| 2013/0184064 A1 | 7/2013 | Manning et al. |
| 2013/0196732 A1 | 8/2013 | Oochi et al. |
| 2014/0004951 A1 | 1/2014 | Kern et al. |
| 2014/0038721 A1 | 2/2014 | Archer et al. |

OTHER PUBLICATIONS http://forum.supercell.net.*
www.kotaku.com—madden nfl 11.*

* cited by examiner

MULTILAYER FRAMEWORK AND ARCHITECTURE WITH VARIABLE VIDEO GAMING CAPABILITIES

CROSS REFERENCE TO RELATED APPLICATIONS

The present application claims the benefit of priority under 35 U.S.C. § 119(e) from U.S. Provisional Application No. 61/643,352 entitled "MULTILAYER FRAMEWORK ARCHITECTURE AND USER INTERFACES FOR VIDEO GAMING APPLICATIONS," filed on May 7, 2012, by Brian Joseph Wiklem, Christopher Robert Masterton, and Carrie Ann Cowan. The entire contents of the provisional application are incorporated by reference herein. The present application also incorporates by reference the contents of utility applications entitled "PROVIDING SYNCHRONIZED AND INTEGRATED VIDEO GAMING," "PROVIDING VIDEO GAMING ACTION VIA COMMUNICATIONS IN A SOCIAL NETWORK," AND "VIDEO GAMING PLATFORM AND USER INTERFACE," which are concurrently submitted, and also claim priority under 35 U.S.C. § 119(e) from U.S. Provisional Application No. 61/643,352.

BACKGROUND

The present disclosure relates to video gaming applications and platforms, including those accessed via online services or communities, for example, social networks, or directly via hosted websites, dedicated either wholly or partially to them. In particular, the present disclosure relates to multilayer system framework and architecture with variable video gaming capabilities.

In recent years, video games have become extremely popular. Video games are used not only for entertainment, but also for instructional purposes. Players typically interact with a gaming application through computer or console peripherals such as keyboard, mouse, joysticks, a wide variety of game pads, and funny controllers such as the NES Zapper®. More recently, nontraditional controller technologies such as dance pads, the Wii-mote® or the Kinect®, offering new types of gaming experiences are beginning to emerge. These technologies are capable of enhancing games to incorporate movement, creating a new experience and attracting new audiences.

With the popularity of social networks reaching epic proportions, social games have also become very popular.

With the ongoing trends and exponential growth in video gaming, it would certainly be beneficial to find better architectures for gaming applications that continue to enhance the user experience.

SUMMARY

The present disclosure overcomes the deficiencies and limitations of the prior art by providing a technology with a flexible architecture for video gaming applications. In some embodiments, the flexible architecture provides a continuous visual experience for players across different platforms (platform agnostic) and engages them at different levels. Each of the players may have a unique and different visual experience, depending upon the gaming platform a player uses. The architecture facilitates access to video gaming applications in various ways, including 1) via social networks or sites, for example, accessed via personal computers; 2) via wall posts or via an online social networking service that enables its users to send and read text-based posts; 3) via mobile devices (iOS®, Android™, or Windows-based smart phones); and 4) via game consoles (for example, PS3®, Xbox 360®, or Wii®).

Video gaming applications may be purchased via platform application stores. These applications are supported by Android (Android is a Linux-based operating system for mobile devices such as smartphones and tablet computers—it is developed by the Open Handset Alliance), iOS (a mobile operating system developed by Apple Inc.) platforms, and phones operating windows. The user interface of an iOS platform is based on the concept of direct manipulation, using multi-touch gestures. Interface control elements consist of sliders, switches, and buttons. The response to user input is immediate and provides a fluid interface.

Video gaming applications may be hosted or accessed via social networks, other third party services or on third party servers, stand-alone platforms, tablets, smartphones or the like. Multiple players (hundreds, thousands, if not millions) may access gaming application via any or all of these ways. In addition, the flexible architecture provides a scalable infrastructure with cross-platform pollination technology (achievements and rewards are transferred between platforms used by particular players) and secure collection of data. Video gaming applications may be based on universal themes that appeal to a broad range of demographics and provides a continuous flow of data analytics. They offer opportunities for configuring advertisements and promotions to accomplish strategic goals.

In some embodiments, the flexible architecture provides multiple levels of play, permitting players to engage in different ways. The different levels of play options include 1) a peer-to-peer competitive challenge level for core players, 2) a casual play option for play with friends with whom a player shares an affinity, for example, in a social network; and a 3) spectator mode that permits non-players in a network to assist friends. Feed-based triggers allow for greater rewards to players and ease of discovering games.

In yet other embodiments, which may include any or all of the aspects described above, the flexible architecture permits mobile play, extending the gaming arena or world to different platforms, so achievements in a particular game may be earned and shared more easily across platforms. In addition, a player may earn location-based rewards.

Moreover, the flexible architecture provides a system of rewards at check-in, to coax players by providing greater incentives. The flexible architecture permits concurrent "solo" play by a player or gamer, collaborative and competitive play by multiple players. The flexible architecture has user interfaces that are configured to provide different experiences for different players, including for example, a three-dimensional user experience. In some embodiments, the video gaming applications include story-driven quests and game play, giving players more than just tasks and chores. As one example, an aviation gaming application may utilize a collection of 250 or more aircrafts and include transactions relating to the aircrafts and their environment, creation of the environment in which the aircrafts operate etc. In this particular application, players may create and manage their experience (for example, build and manage an aviation empire), enjoy the thrill of history (aviation's past), and travel the globe and fly through an open network of friendly and rival airports.

In yet other embodiments, the system provides a plurality of features for player control of the virtual arena including control of "play" times, "gifts" and "rewards," "collect" and "decorate" features, monitor types of "play" (for example, acceleration progress), generate user content, etc.

In some embodiments, the video gaming applications may be free, when accessed via social-network platforms, in which instances revenue is generated via market place for products used during the game, direct advertising etc. The flexible architecture permits for easy access through a particular player's social network, allowing other players to discover a particular game and permit conversion as necessary.

In yet other embodiments, linking or connecting platforms creates a more interesting gaming world.

BRIEF DESCRIPTION OF THE DRAWINGS

The present disclosure is illustrated by way of example, and not by way of limitation, in the figures of the accompanying drawings, in which like reference numerals are used to refer to similar elements.

DETAILED DESCRIPTION

Figure 1:
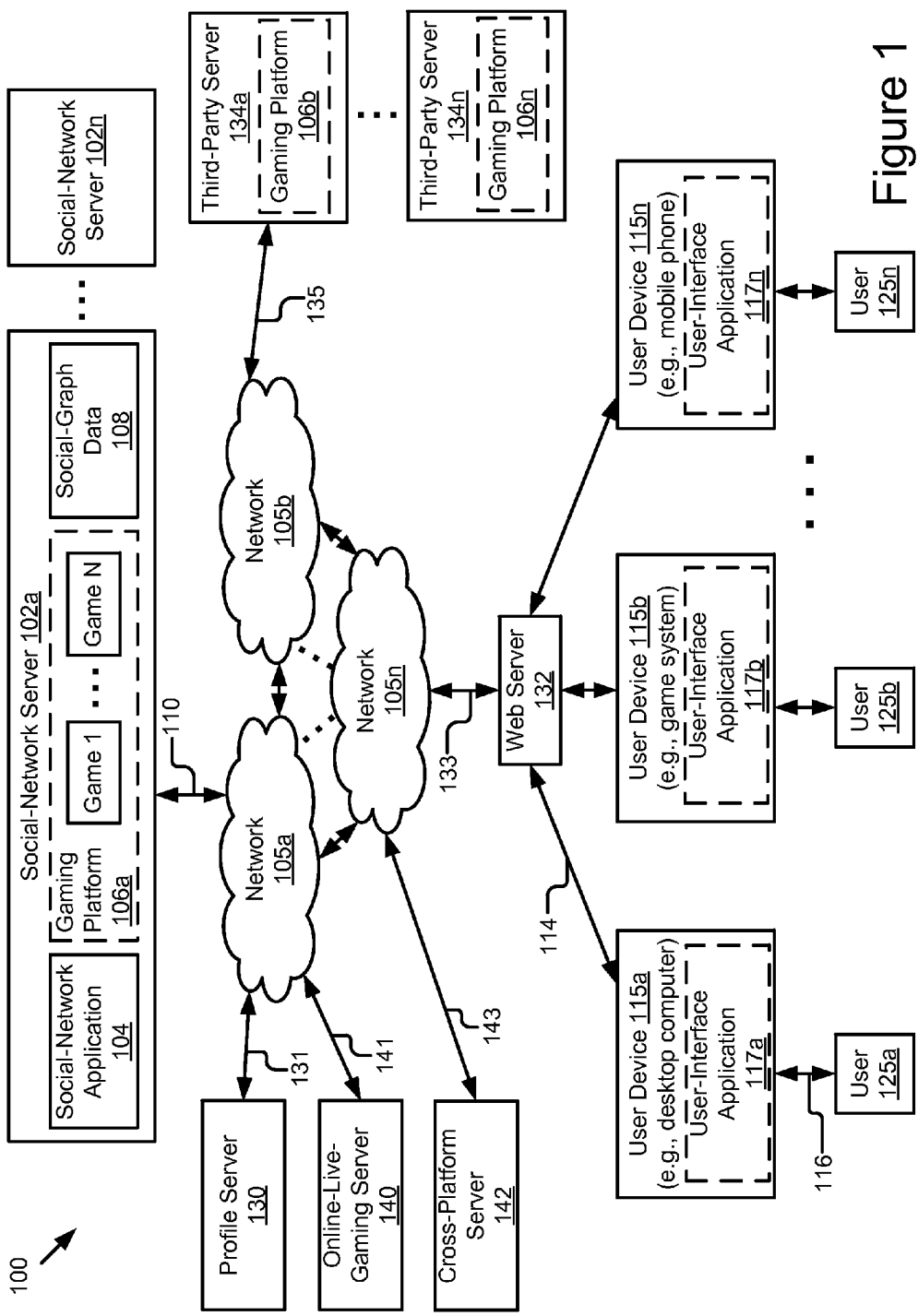
FIG. 1 is a high-level block diagram illustrating some embodiments of a system architecture for providing video gaming platforms, accessed either via a social network (hosted on a social network server or a server associated with it) or a third party video gaming website (hosted by a third party on its server).

The present technology is directed to a multilayer or multi-tier architecture or framework for video games or video gaming applications with variable video gaming capabilities accorded to players or gamers. The video games are for play by users (players or gamers), accessed either via social networks, or directly, on games hosted by third party servers. The specification describes examples of systems and methods for providing this multilayer architecture, video gaming platforms, and user interfaces to facilitate a unique user experience. These video gaming applications may either be hosted by an online community, for example, one or more social networks, or alternatively, by third party servers that are wholly or partially dedicated to gaming applications.

In some embodiments, the flexible and multilayer architecture provides a continuous game and visual experience for players across different platforms (platform agnostic) and engages them at different levels of play and capability. Each of the players may have a unique and different gaming experience, depending upon the level of play and capability accorded to each player. This flexible architecture facilitates access to video gaming applications in various ways, including 1) via social networks or sites, for example, accessed via personal computers (desk tops or lap tops); 2) via wall posts or via an online social networking service that enables its users to send and read text-based posts; 3) via mobile devices (iOS, Android, or Windows-based smart phones); and 4) via game consoles (for example, PS3, Xbox 360, or Wii).

Video gaming applications may be purchased via platform application stores. These applications are supported by Android (Android is a Linux-based operating system for mobile devices such as smartphones and tablet computers— it is developed by the Open Handset Alliance), iOS (a mobile operating system developed by Apple Inc.) platforms, and phone operating windows. The user interface of iOS is based on the concept of direct manipulation, using multi-touch gestures. Interface control elements consist of sliders, switches, and buttons. The response to user input is immediate and provides a fluid interface.

Video gaming applications may be hosted or accessed via social networks, other third party services or on third party servers, stand-alone platforms, tablets, smartphones, or the like. Multiple players (hundreds, thousands, if not millions) may access gaming one or more applications via any or all of these ways. In addition, the flexible architecture provides a scalable infrastructure with cross-platform pollination technology (achievements and rewards are transferred between platforms for particular players depending on their status) and secure data collection. Video gaming applications may be based on universal themes that appeal to a broad range of demographics and provides a continuous flow of data analytics. They offer opportunities for configuring advertisements and promotions to accomplish strategic goals.

In some embodiments, the flexible architecture provides multiple levels of play, permitting players to engage in different ways and at different levels. The different levels of play options include 1) a peer-to-peer competitive challenge level for "core" players, 2) a "casual" play option for play with friends with whom a particular player shares an affinity, for example, in a social network; and 3) a "spectator" mode that permits non-players in a network to assist friends. Feed-based triggers allow for greater rewards to players and ease of discovering games.

In yet other embodiments, which may include any or all of the aspects described above, the architecture permits play via mobile devices, extending the gaming arena or world to different environments, so achievements in a particular game may be earned and shared more easily across environments, depending upon player status. In addition, a player may earn location-based rewards.

Moreover, the system provides rewards at check-in, to coax players by providing greater incentives. The architecture permits for concurrent "solo" play by a player or gamer and collaborative and competitive play between multiple players. User interfaces are configured to provide different experiences for different players, including a three-dimensional user experience in some environments. In some embodiments, the video gaming applications include story-driven quests and game play, giving players more than just tasks and chores. As one example, a "core" player in an aviation gaming application, may utilize a collection of 250 aircrafts and include transactions relating to the aircrafts and its environment, to create an environment in which the aircrafts operate etc. In this particular application, "core" players may create and manage their experience (for example, by creating an aviation empire), enjoy the thrill of history (aviation's past), and travel the globe and fly through an open network of friendly and rival airports. Other players, for example, "followers" may be accorded more restricted play and capability.

The system provides variable features for player control (depending upon player status) of the virtual arena including control of "play" times, "gifts" and "rewards," "collect" and "decorate," monitor "play" (for example, acceleration progress), generate user content, etc.

In some implementations, the architecture accords variable status to players who can opt for different levels of play. A "core" game play status enables players to be "leaders" and play the entire game. A leader has control of all aspects of a particular gaming application. A "casual" or "follower" game play status enables players to play from a different perspective, providing access to only a portion of the entire game. A "spectator" or "bystander" game play enables players to play from a reactive perspective.

Players (with any status described above) may access game play via mobile devices, at any location, and receive location-based rewards. They may access a virtual game arena, their own or that of other players, via several platforms and take up play where they left off. They may link up friends for collaborative play. Players may also participate in standalone game play, via tablets, mobile devices, console-based gameplay, target-based game play or the like. In addition, the system permits cross-pollination game play, sending game objects from one game world or arena to another.

In the following description, for purposes of explanation, numerous specific details are indicated in order to provide a thorough understanding of the technology described. It should be apparent, however, to one skilled in the art, that this technology can be practiced without these specific details. In other instances, structures and devices are shown in block diagram form in order to avoid obscuring the technology. For example, the present technology is described with some embodiments below with reference to particular user interfaces or user platforms and particular hardware. However, the present technology applies to any type of computing device or platform that can receive data and commands, and any devices providing services. Moreover, the present technology is described below primarily in the context of video gaming applications configured to enhance and improve the quality of these gaming applications in order to facilitate synchronous play by hundreds, thousands, if not millions of players. The players may enjoy different user experiences based on their individual preferences and may enjoy seamless play across different gaming platforms or devices (desktop computer, mobile device or the like). However, those skilled in the art should understand that the present technology applies to any type of application and can be used for other applications beyond gaming applications.

Reference in the specification to "one embodiment," "an embodiment," or "some embodiments" means simply that one or more particular features, structures, or characteristics described in connection with the one or more embodiments is included in at least one or more embodiments that are described. The appearances of the phrase "in one embodiment" in various places in the specification are not necessarily all referring to the same embodiment.

Some portions of the detailed descriptions that follow may be presented in terms of algorithms and symbolic representations of operations on data bits within a computer memory of either one or more computing devices or gaming platforms. These algorithmic descriptions and representations are the means used by those skilled in the data processing arts to most effectively convey the substance of their work to others skilled in the art. An algorithm as indicated here, and generally, is conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the following discussion, it should be appreciated that throughout the description, discussions utilizing terms such as "processing," "computing," "calculating," "determining," or "displaying" or the like, refer to the action and processes of a computer system, or similar electronic computing device or platform, that manipulates and transforms data represented as physical (electronic) quantities within the computer system's registers and memories into other data similarly represented as physical quantities within the computer system memories or registers or other such information storage, transmission, or display devices.

The present technology also relates to an apparatus or one or more systems for performing the operations described here. This apparatus or one or more systems may be specially constructed for the required purposes, or it may comprise a general-purpose computer selectively activated or reconfigured by a computer program stored in the computer. Such a computer program may be stored in a computer-readable storage medium, such as, but not limited to, any type of disk including floppy disks, optical disks, CD-ROMs, magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

This technology can take the form of an entirely hardware embodiment, an entirely software embodiment, or an embodiment containing both hardware and software components. In some embodiments, this technology is implemented in software, which includes but is not limited to firmware, resident software, microcode, etc.

Furthermore, this technology can take the form of a computer program product accessible from a computer-usable or computer-readable medium providing program code for use by or in connection with a computer or any instruction execution system. For the purposes of this description, a computer-usable or computer-readable medium may be any apparatus that can contain, store, communicate, propagate, or transport the program for use by or in connection with the instruction execution system, apparatus, or device.

A data processing system suitable for storing and/or executing program code includes at least one processor coupled directly or indirectly to memory elements through a system bus. The memory elements may include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Communication units including network adapters may also be coupled to the systems to enable them to couple to other data processing systems, remote printers, or storage devices, through either intervening private or public networks. Modems, cable modems, and Ethernet cards are just a few examples of the currently available types of network adapters.

Finally, the algorithms and displays presented in this application are not inherently related to any particular computer, gaming platform or other apparatus. Various general-purpose systems may be used with programs in accordance with the teachings here, or it may prove convenient to construct more specialized apparatus to perform the required method steps. The required structure for a variety of these systems is outlined in the description below. In addition, the present technology is not described with reference to any particular programming language. It should be understood that a variety of programming languages may be used to implement the technology as described here.

System Architecture Overview

FIG. 1 is a high-level block diagram illustrating some embodiments of systems for providing gaming applications, either via social networks or on third party servers. The system 100 illustrated in FIG. 1 provides gaming platforms 106a or 106b so that participants (players or gamers) may access one or more gaming applications, initiate a play on one device or gaming platform and continue play at another device or gaming platform, making transitions between devices or platforms essentially seamless and enabling a continuous playing experience.

The system 100 includes one or more social network servers 102a through 102n that may be accessed via user devices 115a, 115b through 115n, which are used by users 125a, 125b, through 125n, to connect to any one of the social network servers 102a through 102n. The user devices 115a through 115n may be a desktop computer, a game system or a mobile phone. These entities (user devices 115a-115n and social network servers 102a-102n) are communicatively coupled via one or more networks 105a, 105b, and 105n. Although only three user devices or platforms 115a, 115b through 115n are illustrated, any numbers of user devices or platforms 115n may be used by any number of users (players, gamers, or the like) 125n. Moreover, those skilled in the art should recognize that while the present disclosure is described below primarily in the context of providing gaming applications, the present disclosure may be applicable to other types of applications, for entertainment or otherwise. As one example, gaming applications may include operations for creating plays, participating in plays, etc.

The user devices 115a through 115n in FIG. 1 are illustrated by way of example. Although FIG. 1 illustrates only three devices, the present disclosure applies to any system architecture having one or more user devices 115a through 115n, therefore, any number of user devices 115n (hundreds, thousands, even millions or more) may be used.

Furthermore, while only three networks 105a, 105b, and 105n are illustrated as coupled to the user devices 115a, 115b through 115n, the social network servers 102a-102n, the profile server 130, the web server 132, and one or more third party servers 134a through 134n, in practice, any number of networks 105n may be connected, either directly or indirectly, to these entities. In addition, although only two third party servers 134a through 134n are shown, the system architecture 100 may include one or more third party servers 134n, each with a gaming platform 106b through 106n, operating one or more gaming applications that are similar or different.

In some embodiments, the social network server 102a is coupled to the network 105a, via a signal line 110. The social network server 102a includes a social network application 104, which comprises the software routines and instructions to operate the social network server 102a and its functions and operations. Although only one social network server 102a is described here, persons of ordinary skill in the art should recognize that multiple servers may be present, as illustrated by social network servers 102n, each with functionality similar to social network server 102a or different.

The term "social network" as used here encompasses its plain and ordinary meaning including, but not limited to, any type of social structure where the users are connected by a common feature or link. The common feature includes relationships/connections, e.g., friendship, family, work, a similar interest, etc. The common features are provided by one or more social networking systems, such as those included in the system architecture 100, including explicitly-defined relationships and relationships implied by social connections with other online users, where the relationships form a social graph 108.

The term "social graph" as used here encompasses its plain and ordinary meaning including, but not limited to, a set of online relationships between users (players and non-players), such as provided by one or more social networking systems, operating on social network servers 102a through 102n, including explicitly-defined relationships and relationships implied by social connections with other online users, where the relationships form a social graph. In some examples, the social graph 108 may reflect a mapping of these users and how they are related.

It should be understood that social network server 102a and the social network software/application 104 are representative of a single social network. Each of the plurality of social networks 102a through 102n is coupled to any one of the networks 105a, 105b, and 105n, each having its own server, application, and social graph. For example, a first social network system operated or hosted on a social network server may be directed to business networking, a second directed to or centered on academics, a third directed to local business, a fourth directed to dating or gaming, and yet others directed to other general interests or perhaps a specific focus. Yet, each may provide access to a gaming platform 106a for operating or providing access to video gaming applications.

A profile server 130 is illustrated as a stand-alone server in FIG. 1. In other embodiments of the system architecture 100, all or part of the profile server 130 may be part of the social network server 102a. The profile server 130 is directly connected to the network 105a, via a line 131. The profile server 130 stores profiles for all the users that belong to a social network. A third party server 134a is connected to the network 105b, via a signal line 135. A web server 132 is connected, via a line 133, to the network 105n. The web server 132 delivers access to content, via the internet, for example, by hosted websites or the like. Users may use the web browsers on their electronic devices or gaming platforms to browse for gaming applications and access websites hosting gaming applications. An online-live-gaming server 140 is connected to the network 105a by line 141 and a cross-platform server 142 is connected to a network 105n by line 143. The cross-platform server 142 may serve as a gateway to different servers and accommodating access by different user platforms.

The user devices or player gaming platforms 115a through 115n can be a computing device, for example, a laptop computer, a desktop computer, a tablet computer, a mobile telephone (iOS, Android, or windows-based phone, a personal digital assistant (PDA), a mobile email device, a portable game player, a game console (PS3, Xbox 360, Wii or the like) a portable music player, a television with one or more processors embedded in the television or coupled to it, or any other electronic device capable of accessing a network and participating in a gaming application. The user devices 115a through 115n include user-interface applications indicated by reference numerals 117a, 117b, through 117n.

The network 105a, 105b, or 105n, is of conventional type, wired or wireless, and may have any number of configurations, such as a star configuration, token ring configuration, or other configurations known to those skilled in the art. Furthermore, the network 105 may comprise a local area network (LAN), a wide area network (WAN, e.g., the Internet), and/or any other interconnected data path across which one or more devices may communicate.

In another embodiment, the network 105a, 105b, or 105n may be a peer-to-peer network. The network 105a, 105b, or 105n may also be coupled to or include portions of one or more telecommunications networks for sending data in a variety of different communication protocols.

In yet another embodiment, the network 105a, 105b, or 105n, includes Bluetooth communication networks or a cellular communications network for sending and receiving data such as via short messaging service (SMS), multimedia messaging service (MMS), hypertext transfer protocol (HTTP), direct data connection, WAP, email, etc.

In some embodiments, the social network server 102a, the profile server 130, the web server 132, the online-live-gaming server 140, and cross-platform server 142, and the third party servers 134a through 134n are hardware servers including a processor, memory, and network communication capabilities. One or more of the users (players or gamers) 125a through 125n access any of the social network servers 102a through 102n, or the third party servers 134a through 134n, or any of the other servers, via browsers in their user devices or gaming platforms and via the web server 132. The user devices 115a through 115n have user interface applications 117a, 117b, through 117n, that manage access by particular players to select gaming applications or their choice.

Figure 2:
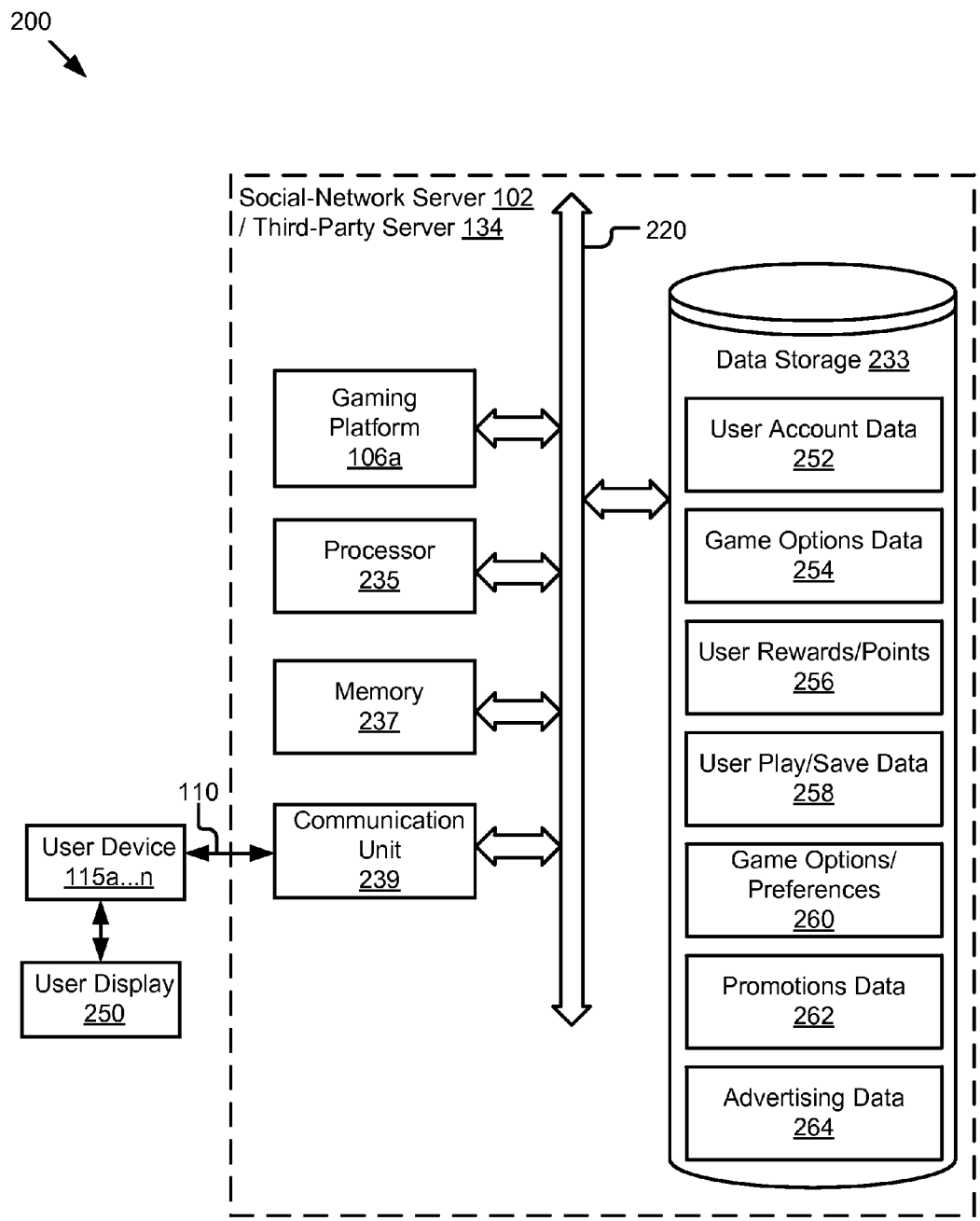
FIG. 2 is a block diagram illustrating some embodiments of a social network server or a third party server shown in FIG. 1, including its hardware components.

FIG. 2 is a block diagram illustrating some embodiments of the social network server 102 (a through n) or third party server 134 (a through n) or any other server hosting a gaming environment. In FIG. 2, like reference numerals have been used to reference like components with the same or similar functionality that has been described above with reference to FIG. 1. Since those components have been described above that description is not repeated here. The social network server 102a generally comprises one or more processors, although only one processor 235 is illustrated in FIG. 2. The processor is coupled via a bus 220 to memory 237 and database storage 233, which stores user account data 252, game options data 254, user rewards/points 256, user play/save data 258, game options/preferences 260, promotion data 262 and advertising data 264.

In some embodiments, the database storage 233 is a database organized by the hosting server and the user or either one. For each user or player, the data storage 233 stores data on the user and user game plays etc. For example, this data may include related social network activity such as posts, shares, invitations, status changes etc., associated with each user engaged in a video gaming application.

A user or player 125a, via a user or gaming device 115a, communicates a request to initiate a gaming application or reacts to a keyword via communication unit 239. The "set up" for a video gaming application is managed by the gaming platform 106a. It should be recognized that the gaming platform 106a (illustrated in the social network server 102a) and 106b (illustrated in the third party server 134a) are shown separately, but include similar functionality, at least for purposes of operating the gaming applications. A user or player display 25 coupled to the user device 115a through n, is configured to provide the video source of the gaming application in one of many formats, high definition graphics, three dimensional formats etc.

Figure 3:
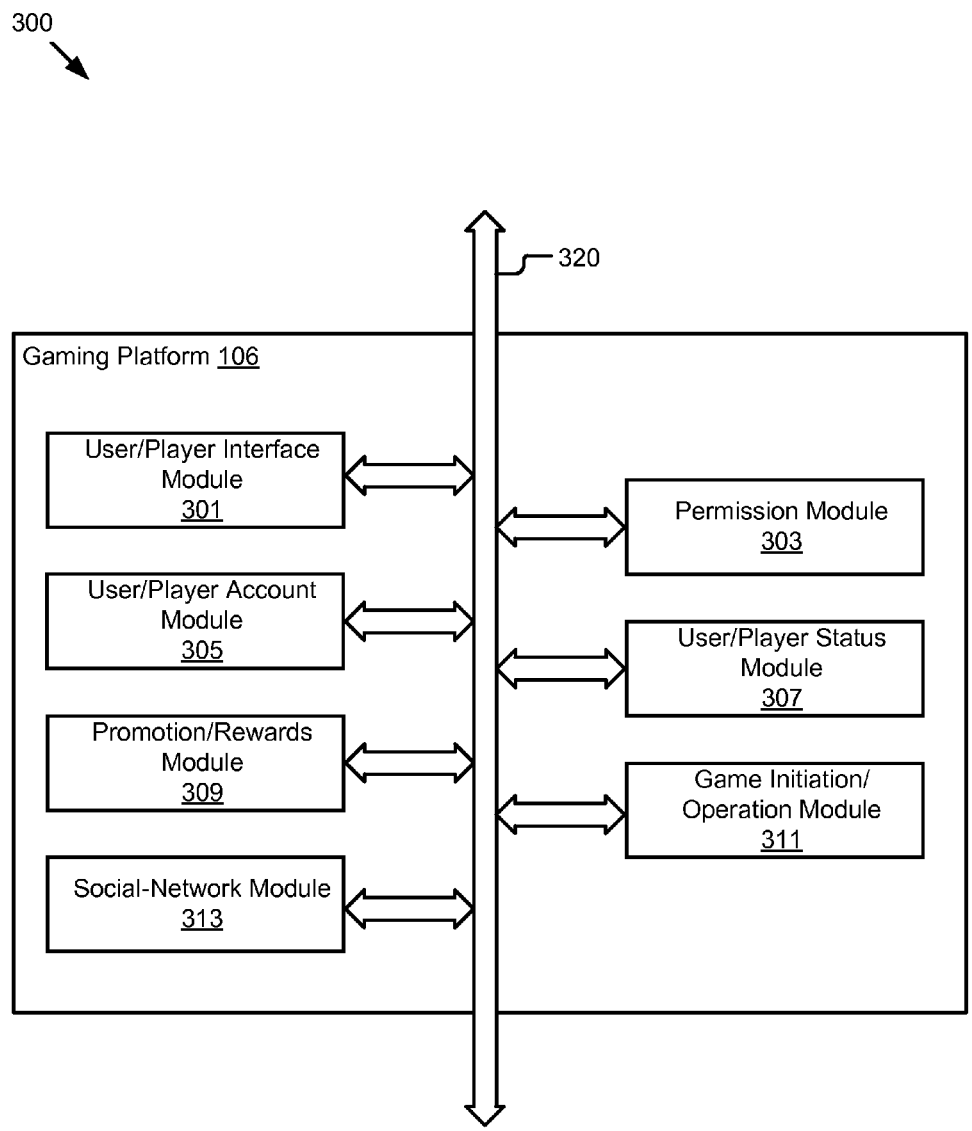
FIG. 3 is a block diagram illustrating some embodiments of a gaming platform shown in FIGS. 1 and 2, and its software components.

Referring now to FIG. 3, like reference numerals have been used to reference like components with the same or similar functionality that has been described above with reference to FIG. 1. Since those components have been described above, that description is not repeated here. The gaming platform or environment 106 (a or b) includes various modules that are programmed to perform the functionalities described here. These modules may be variously distributed or may be in a single unit. The gaming platform 106 includes a user/player interface module 301, a permissions module 303, a user/player account module 305, a user/player status module 307, a promotion module 309, a game initiation module 311, and a social-network module 313. Each of these modules is coupled to a software communication mechanism 320 to communicate the other modules. Examples of a software communications mechanism 320 may be an object bus (such as COBRA), direct socket communication (such as TCP/IP sockets) among software modules, remote procedure calls, UDP broadcasts and receipts, HTTP connections, function or procedure calls etc. Further, any or all of the communication could be secure (SSH, HTTPS, etc.). The software communication can be implemented on any underlying hardware, such as a network, the Internet, a bus 220 of FIG. 2, or a combination thereof etc.

As one example, a particular user 125a communicates via a user device 115a, to either initiate or react to a game play. The user interface module 301 facilitates a connection of the user device 115a with the social network server 102a, in the event the player wishes to engage or participate in a gaming application via the social network server 102a. The permission module 303 ensures that the user device is compliant with protocols and any privacy concerns. Once a video gaming application has been set up, the user/player account module 305 makes a note of the user to determine if the user has an existing account or must create one. The user/player status module 307 considers the status of the various users ("leader," "follower," or "spectator"). A promotion module 309 operates the necessary promotions permitting players to earn rewards accorded by the promotions. The game initiation module 311 initiates play and the social network module 313 tracks the applications engaged by a particular player and updates the player's social profile accordingly.

Example Methods

Figure 4:
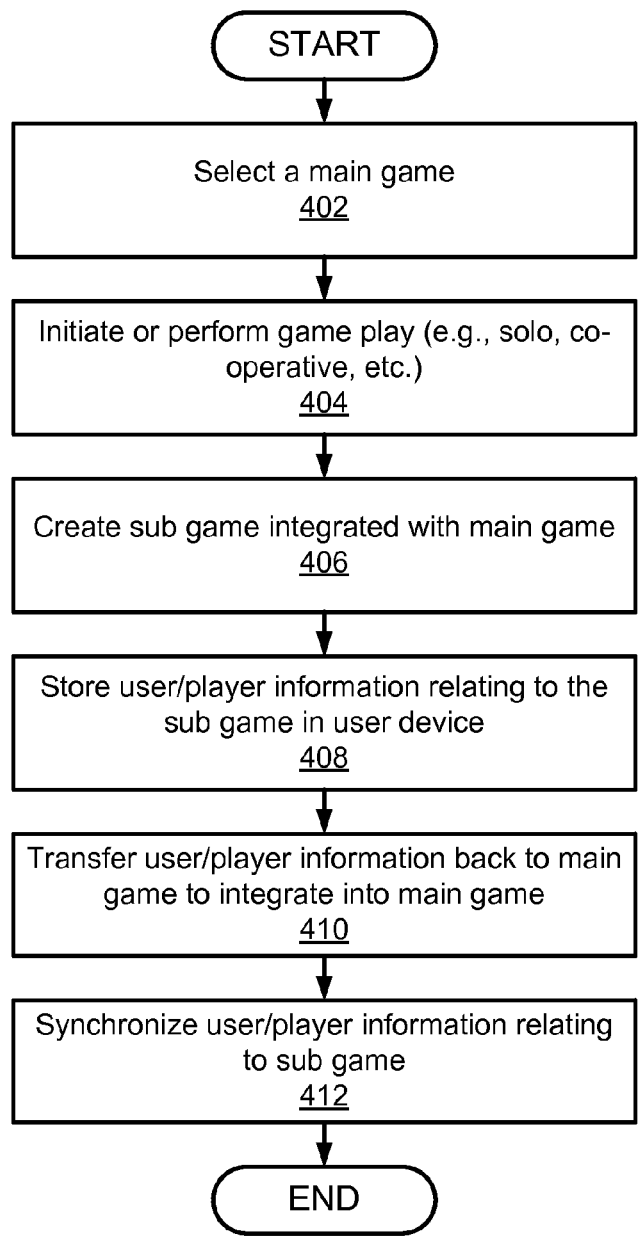
FIG. 4 is an example flow chart illustrating an example general method for creating or branching off a sub game.

FIG. 4 is a flow chart illustrating one example method 400 for one or more users (players or gamers) to select a "main" game and branch off for playing a portion of the "main" game. The method 400 begins with selecting a "main" game at block 402, and initiating a game play, for either "solo" play or collaborative or cooperative play, illustrated by block 404. The method 400 proceeds to the next block 406, at which point, one or more players (with their user devices) create one or more sub games based on the "main" game or branching off from the "main" game. As explained above, players may pursue a particular aspect of the "main" game, separately, either via the same player device, or via another user device (for example, move from a desktop or dedicated game console, to a mobile device, for example, a smartphone).

The method 400 proceeds to block 408, at which stage, user information relating to the sub game is stored on the user device. At block 410, the method 400 proceeds and transfers the user information to the "main" game. Finally, the method 400 proceeds to block 412, at which stage, the "main" game is synchronized with the user information obtained from the sub game.

Figure 5:
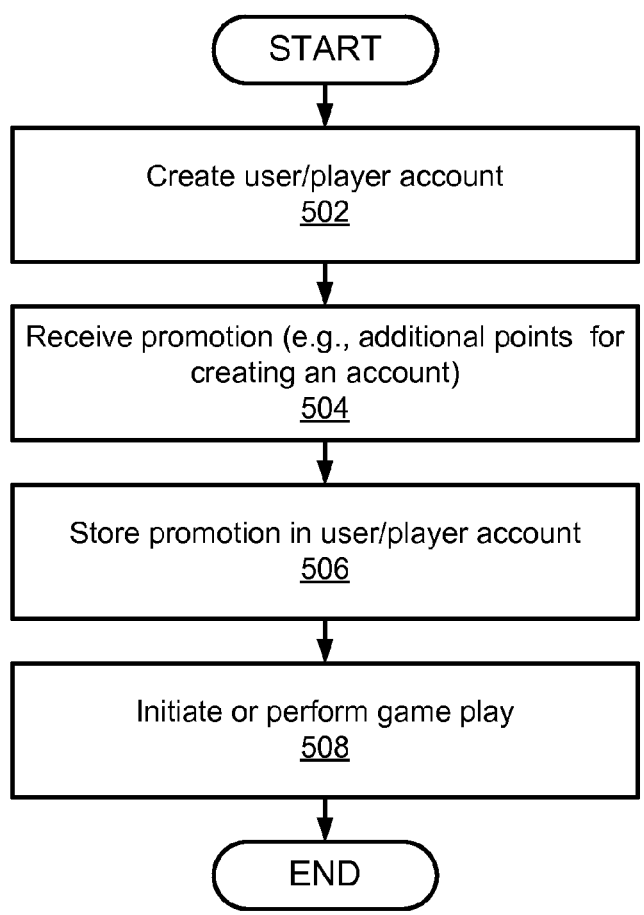
FIG. 5 is an example flow chart illustrating an example method for obtaining a promotion.

Referring now to the flow chart illustrated in FIG. 5, an example method for obtaining a promotion is described. As described above, video gaming applications may be used in conjunction with promotions or advertising in order to coax players to purchase products or services that are either related to the gaming applications or otherwise. The user interface is configured to provide rewards to players upon receiving the promotions or advertising. The example method 500 illustrated here begins at block 502, where user or player accounts are created when a user or player decides to initiate play of a particular gaming application. The player then participates in the promotion, for example, by viewing the particulars of a promotion (advertising on a product or service), and receives additional points for creating an account, as indicated at block 504. The method 500 proceeds to block 506, where the promotion is stored into the particular player's account and at block 508 the player initiates game play.

Figure 6:
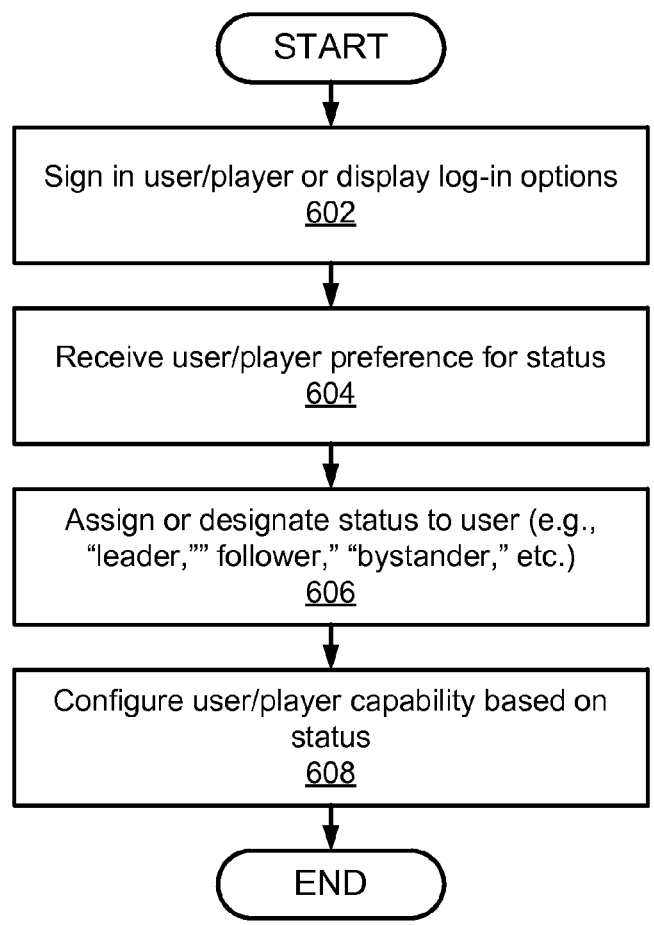
FIG. 6 is an example flow chart illustrating an example method for assigning a status ("leader" or "core," "follower" or "casual," or "bystander" or "spectator") to a player.

Referring now to the flow chart illustrated in FIG. 6, some example operations for providing multiple levels of play are illustrated. In particular, FIG. 6 illustrates an example method 600 for assigning a status to a player. The method 600 begins and proceeds to block 602, at which point users are signed in. The user or player can indicate preferences for the level of play the user desires to participate at, which are received by the video gaming platform, as illustrated at block 604. The video gaming platform assigns a status to the user, at block 606, for example, designating the user as a "leader," a "follower," a "bystander" or any other designation used by the video gaming application. Each of these designations imposes limits on play associated with them. For example, as indicated above, a "leader" is permitted to play the entire game whereas a "follower" is permitted to play only a portion of the game. The video gaming platform modifies player capabilities based on user status, as illustrated at block 608. User "status" accords full play capabilities to a "leader," "restricted" or "limited" play capabilities to a "follower" and "viewing" and capability to "influence" play with keyword responses to a "bystander."

Figure 7:
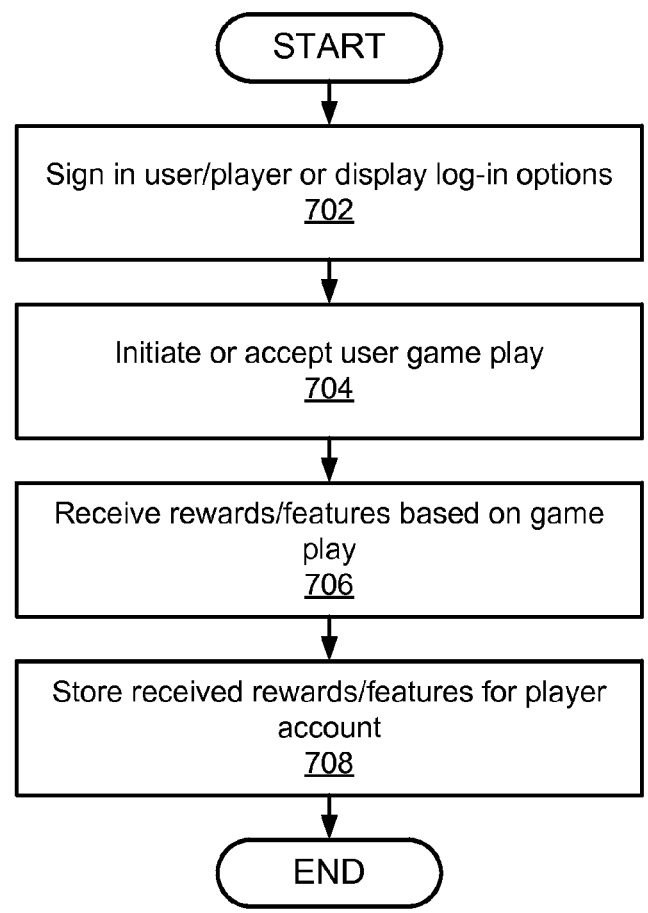
FIG. 7 is an example flow chart illustrating an example method for earning rewards or features within a game.

FIG. 7 illustrates an example method 700 for earning rewards/features within a game. The example method 700 begins and proceeds to block 702, at which stage, a user or player signs in or is displayed log-in options. The method 700 proceeds to block 704 including one or more operations for initiating or accepting user game play. The method 700 proceeds to block 706, at which stage, one or operations receive rewards and/or features for players based on game play. The method 700 proceeds to the next block 708, which includes one or more operations for storing received rewards and/or features for player accounts.

Figure 8:
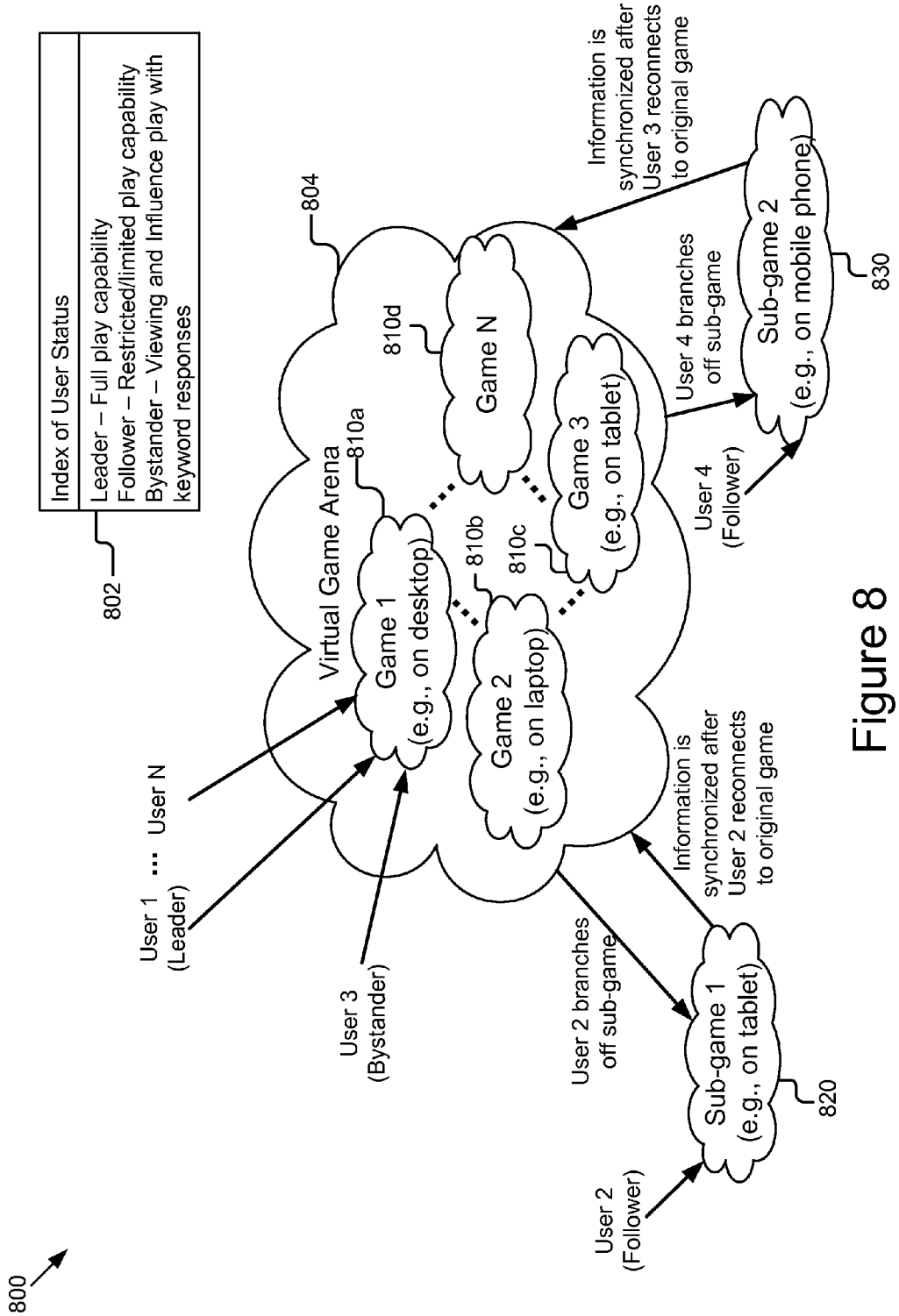
FIG. 8 is a graphical representation illustrating a virtual game arena accessed by various users with varying status and an index of user status.

FIG. 8 illustrates that multiple users, for example, Users 1, 2, 3, through N, each with a different status, for example, either "leader," "bystander," or "follower," may initiate games, for example Game 1 (indicated by reference numeral 810a), Game 2 (indicated by reference numeral 810b), Game 3 (indicated by reference numeral 810c), through Game N (indicated by reference numeral 810d). Each of these games is played in a virtual game arena 804, either individual or shared, hosted on a dedicated server or in a cloud. User 2 is illustrated as branching off a sub game 1 (indicated by reference numeral 820), for separate play. Any information accumulated during the sub game is synchronized after User 2 reconnects to the original game. A user with "bystander" status may influence the game by responding to wall posts or responding with a key word. Reward or point allocation is based on the status of the player. For example, a player playing a game (for example, a follower), receives rewards or takes away from the main game player more than a bystander does. A bystander does not receive any rewards; its role is simply to assist a friend or influence game play by a "core" player.

Figure 9:
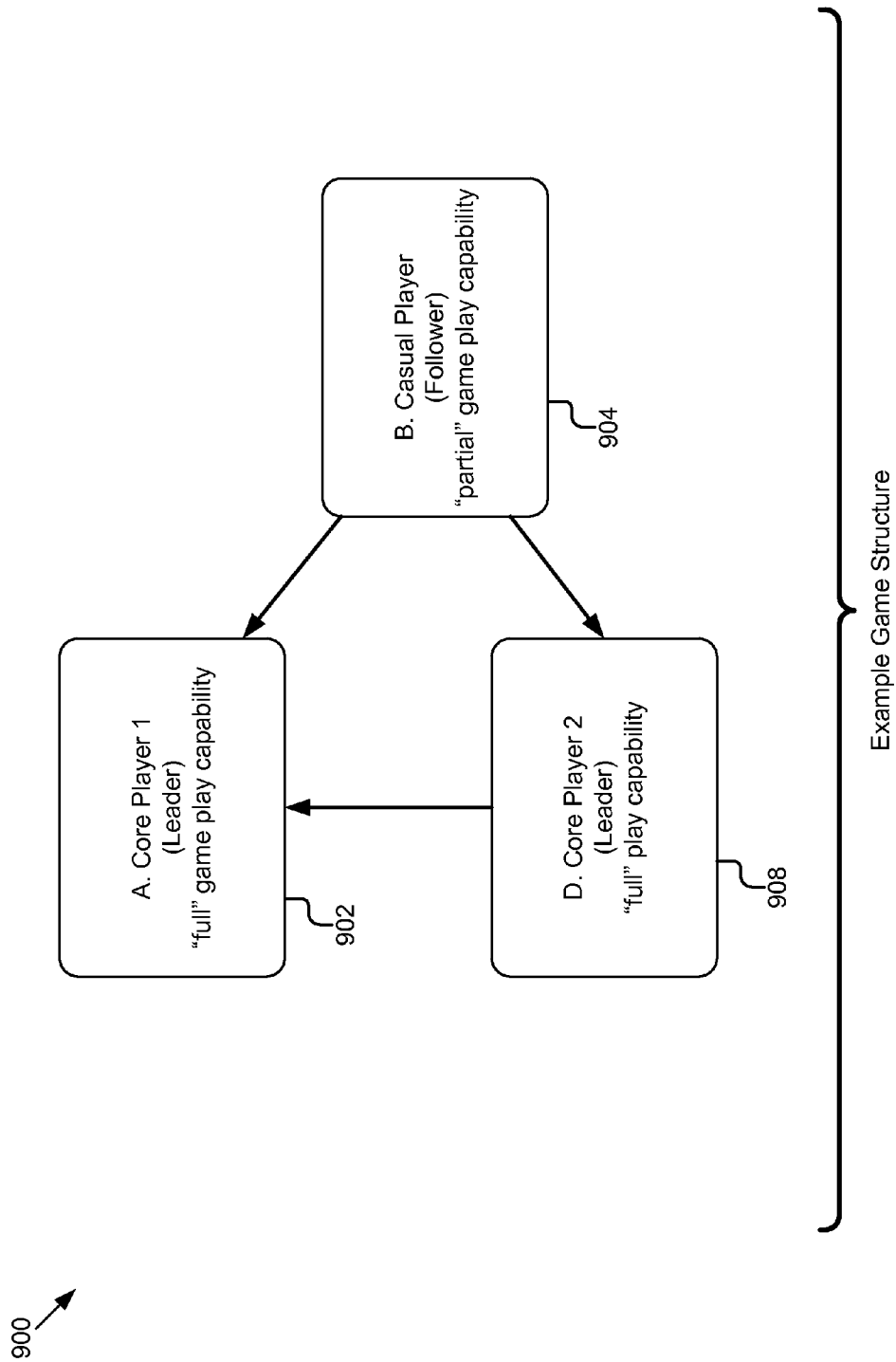
FIG. 9 is a graphical representation illustrating one example of a game structure.

FIG. 9 illustrates a video gaming scenario, with two core players 1 and 2 (at A and D), who have a "leader" status, illustrated at 902 and 908. A "casual" player or "follower" (at B) is illustrated by reference numeral 904 and has the capability to influence both the core players, as indicated by the arrows. Additionally, a "core" player, for example, Player 2, can participate as a "bystander" as well and influence another "core" player, Player 1. A non-player or "bystander" may also participate and provide keyword-based participation. All the various players interact with each other, some having larger impact (those that are "leader" or "core" players) on the play of another "core" player, whereas a "casual" player has a smaller or little impact on the play of others, and a "bystander" has even less impact.

As one example, a religious gaming application is described here. A "core" player may create his or her own church or organization. Another "core" player 2 may create his or her own church or organization as well. The "casual" player 3 may be a follower of both "core" Player 1 and Player 2, such that acts by the "follower" either enhance or detract a play by Player 1 or Player 2. For example, the "follower" Player 3 may give virtual money ($10 per day out of a $20) to each of the "core" players. Circumstances may change this flow of money, for example, "core" Player 2 upsets follower Player 3, who routes all of his virtual money to Player 1. Player 2 may retaliate against Player 3, by initiating an action against Player 1, creating a deficit in his or her account, thereby impacting the play by Player 1. Likewise, the bystander C may continue to influence plays by Player 1 or Player 2.

Figure 10:
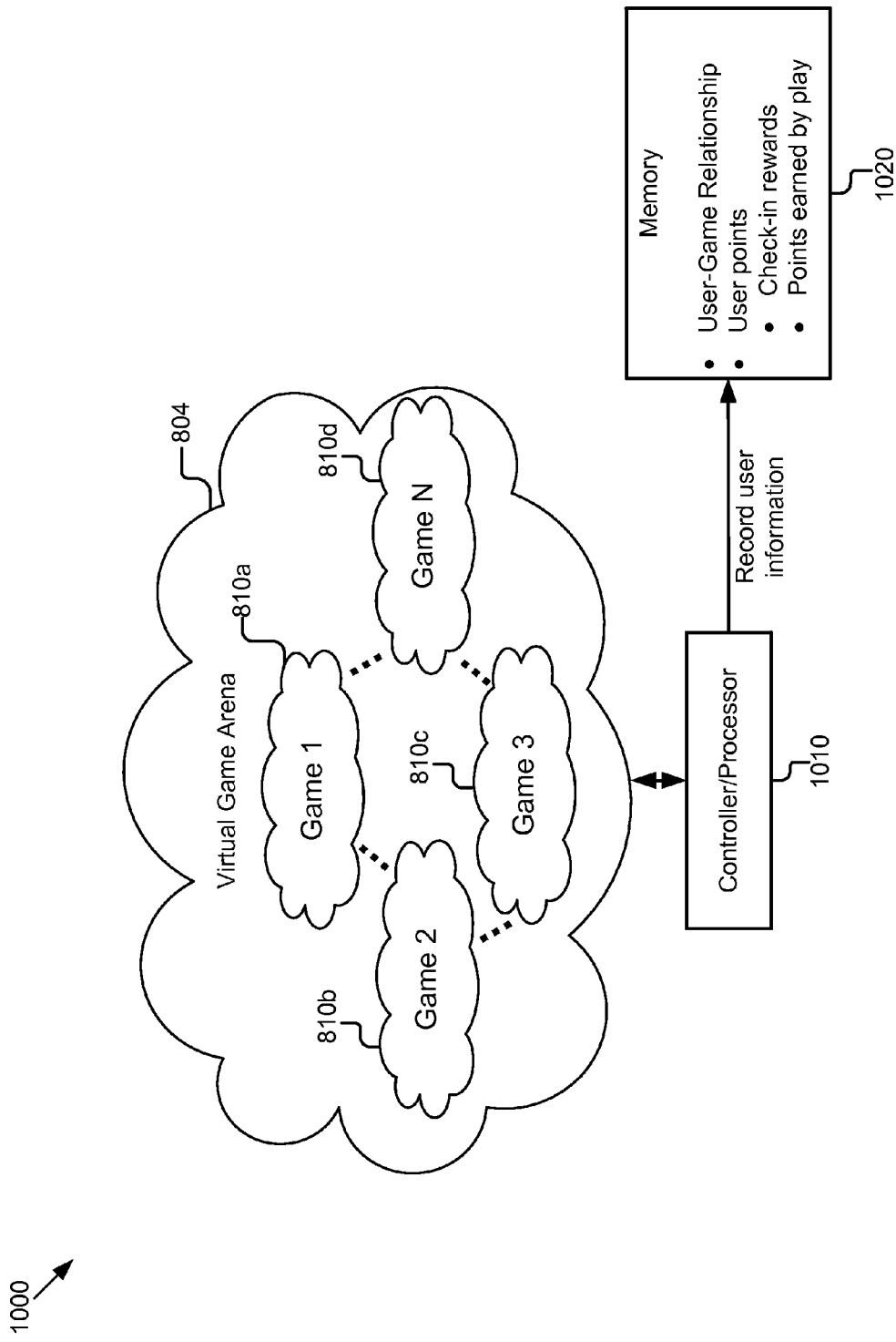
FIG. 10 is a graphical representation illustrating a virtual game arena with concurrent operation of multiple games.

FIG. 10 illustrates a gaming scenario with the virtual game arena 804 with Game 1 (indicated by reference numeral 810a), Game 2 (indicated by reference numeral 810b), Game 3 (indicated by reference numeral 810c) through Games N (indicated by reference numeral 810d) engaged by users. A user creates an account to play any of these games and may receive display of a promotion or advertisement. The user may acknowledge the promotion and instantly earn points or rewards from the game. These operations are controlled by a controller or processor 1010. User information is recorded in memory 1020. The user information may be user-game relationship data, user points (check-in rewards and points earned by play).

Figure 11:
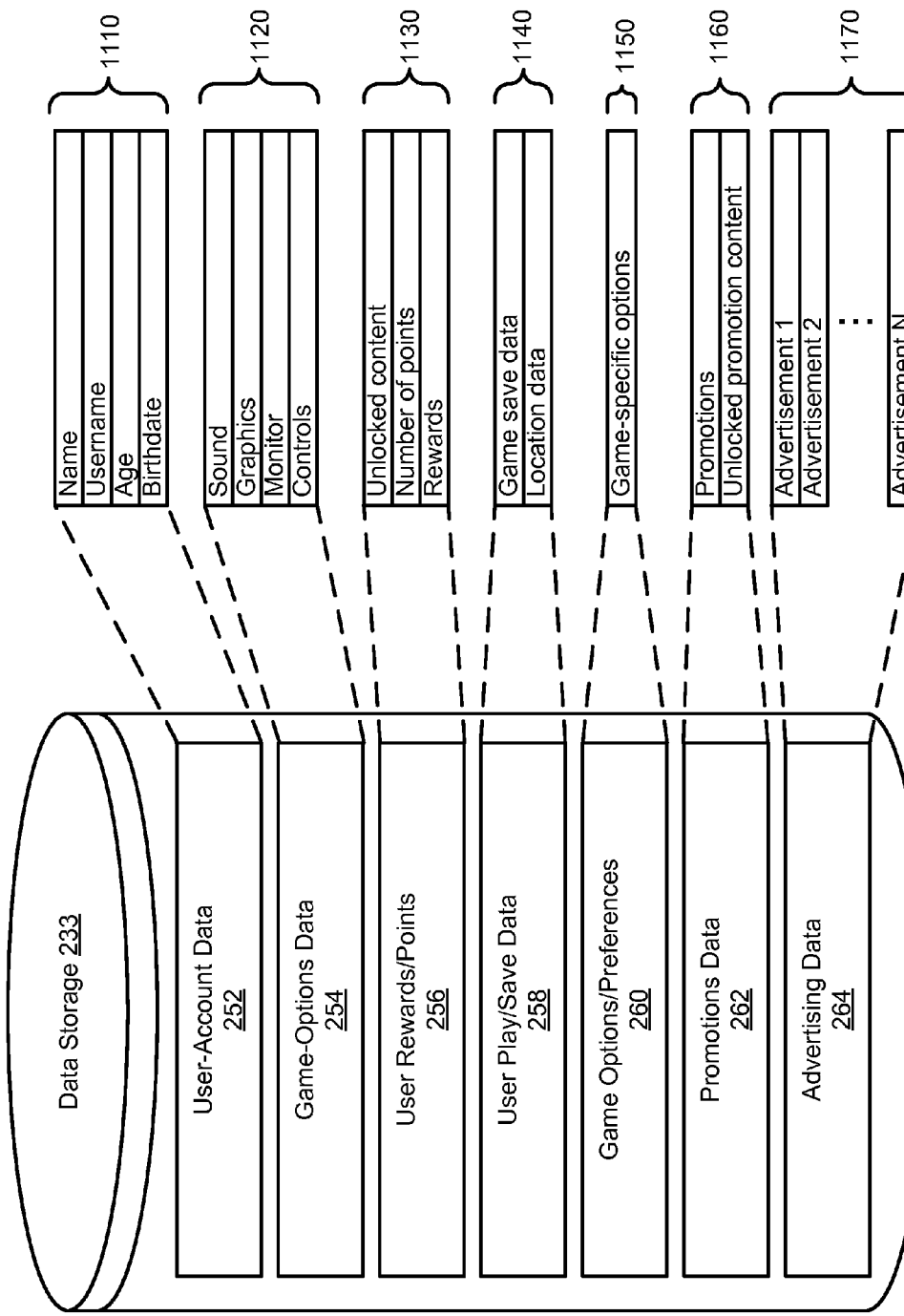
FIG. 11 is a graphical representation of a data storage configuration with storage of game-related information.

FIG. 11 illustrates an example data storage configuration. The data storage 233 may include various types of data. In a first data cell 252, the data storage 233 includes user-account data 252, which may include a name, user name, age and birthdate, all of these items indicated generally by reference numeral 1110. The data storage 233 in a second cell may include a game-options data, including data on sound, graphics, monitor, and controls, indicated generally by reference numeral 1120. The data storage 233 may include in a third cell, user rewards/points including data on unlocked content, number of points, and rewards, all of these items indicated generally by reference numeral 1130. In a fourth cell, the data storage 233 includes a user play/save data indicated by reference numeral 258 including as examples "game save" data or "location" data, both examples indicated generally by reference numeral 1160. In a fifth cell, the data storage 233 includes game options/preferences, indicated by reference numeral 260, including as one example game-specific options, indicated by reference numeral 1150. In a sixth cell, the data storage 233 may include promotions data, indicated by reference numeral 262, including as examples data on promotions, and unlocked promotion content, indicated generally by reference numeral 1160. In a seventh cell, the data storage 233 includes advertising data, indicated by reference numeral 264, which may include data on advertisements 1, 2, through N, all of this data indicated generally by reference numeral 1170.

The foregoing description of the embodiments of the present technology has been presented for the purposes of illustration and description. It is not intended to be exhaustive or to limit the present technology to the precise form disclosed. Many modifications and variations are possible in light of the above teaching. It is intended that the scope of the present technology be limited not by this detailed description, but rather by the claims of this application. As should be understood by those familiar with the art, the present technology may be embodied in other specific forms, without departing from the spirit or essential characteristics thereof. Likewise, the particular naming and division of the modules, routines, features, attributes, methodologies, and other aspects are not mandatory or significant, and the mechanisms that implement the present invention or its features may have different names, divisions and/or formats. Furthermore, as should be apparent to one of ordinary skill in the relevant art, the modules, routines, features, attributes, methodologies and other aspects of the present technology can be implemented as software, hardware, firmware, or any combination of the three. Also, wherever a component, an example of which is a module, of the present technology is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present technology is in no way limited to implementation in any specific programming language, or for any specific operating system or environment. Accordingly, the disclosure of the present technology is intended to be illustrative, but not limiting, of the scope of the present invention, which is set forth in the following claims.

What is claimed is:

1. A computer-implemented method for implementing a multilayer architecture for video gaming, comprising:
   providing a video gaming environment hosted on a server;
   providing access, using the server, to the video gaming environment by a plurality of user devices associated with a plurality of users; and
   designating, using the server, a status level from a plurality of status levels to each user of the plurality of users, wherein each status level of the plurality of status levels provides a different capability within the video gaming environment, the plurality of status levels including a first player status level that accords full access and play within the video gaming environment, a second player status level that accords restricted access and play within the video gaming environment; and a third player status level that accords reactive access and play within the video gaming environment, the reactive access specifying that a keyword response commented by a user having the third player status level on a social network post of a user having the first player status level or the second player status level affects elements of gameplay on the video gaming environment.

2. A computer-implemented method according to claim 1, wherein the plurality of users access the video gaming environment via the user devices including at least one of a group of a personal computer, a laptop, a mobile device, a gaming console, and a tablet.

3. A computer-implemented method according to claim 1, wherein the video gaming environment is hosted in association with a social network server.

4. A computer-implemented method according to claim 1, wherein the video gaming environment is hosted on a third party server.

5. A computer-implemented method according to claim 1, wherein the video gaming environment is hosted in a cloud of distributed servers.

6. A computer-implemented method according to claim 1, wherein the video gaming environment is hosted on a cross-platform server accommodating access by all the user devices.

7. A computer-implemented method according to claim 1, wherein the plurality of users access the video gaming environment for concurrent play.

8. A system for implementing a multilayer architecture for video gaming, comprising a processor and a memory, wherein the memory provides instructions that cause the processor to:
   provide a video gaming environment hosted on a server;
   provide access to the video gaming environment by a plurality of user devices associated with a plurality of users;
   designate a status level from a plurality of status levels to each user of the plurality of users, wherein each status level of the plurality of status levels provides a different capability within the video gaming environment, the plurality of status levels including a first player status level that accords full access and play within the video gaming environment, a second player status level that accords restricted access and play within the video gaming environment; and a third player status level that accords reactive access and play within the video gaming environment, the reactive access specifying that a keyword response commented by a user having the third player status level on a social network post of a user having the first player status level or the second player status level affects elements of gameplay on the video gaming environment.

9. A system according to claim 8, wherein the plurality of users access the video gaming environment via the user devices including at least one of a group of a personal computer, a laptop, a mobile device, a gaming console, and a tablet.

10. A system according to claim 8, wherein the video gaming environment is hosted in association with a social network server.

11. A system according to claim 8, wherein the video gaming environment is hosted on a third party server.

12. A system according to claim 8, wherein the video gaming environment is hosted in a cloud of distributed servers.

13. A system according to claim 8, wherein the video gaming environment is hosted on a cross-platform server accommodating access by all of the user devices.

14. A system according to claim 8, wherein the plurality of users access the video gaming environment for concurrent play.

\* \* \* \* \*